(12) United States Patent
Ranade

(10) Patent No.: US 10,919,377 B2
(45) Date of Patent: Feb. 16, 2021

(54) BELT DRIVEN CONTINUOUS VARIABLE TRANSMISSION SYSTEM FOR HYBRID VEHICLES

(71) Applicant: Atul A Ranade, Navi Mumbai (IN)

(72) Inventor: Atul A Ranade, Navi Mumbai (IN)

( * ) Notice: Subject to any disclaimer, the term of this patent is extended or adjusted under 35 U.S.C. 154(b) by 743 days.

(21) Appl. No.: 15/562,787

(22) PCT Filed: Dec. 16, 2015

(86) PCT No.: PCT/IB2015/059654
§ 371 (c)(1),
(2) Date: Sep. 28, 2017

(87) PCT Pub. No.: WO2016/162737
PCT Pub. Date: Oct. 13, 2016

(65) Prior Publication Data
US 2018/0281582 A1    Oct. 4, 2018

(30) Foreign Application Priority Data

Apr. 10, 2015   (IN) .......................... 1507/MUM/2015

(51) Int. Cl.
*B60K 6/543*   (2007.10)
*F16H 9/12*    (2006.01)
(Continued)

(52) U.S. Cl.
CPC .............. *B60K 6/543* (2013.01); *B60K 6/442* (2013.01); *B60K 6/52* (2013.01); *F16H 9/12* (2013.01);
(Continued)

(58) Field of Classification Search
CPC ... B60K 6/00; B60K 6/20; B60K 6/22; B60K 6/36; B60K 6/365; B60K 6/42;
(Continued)

(56) References Cited

U.S. PATENT DOCUMENTS

| | | | | |
|---|---|---|---|---|
| 1,727,232 | A | * | 9/1929 | Farrell .................... F16H 37/06 475/72 |
| 2,158,047 | A | * | 5/1939 | Weston .................... F16H 9/24 474/30 |

(Continued)

FOREIGN PATENT DOCUMENTS

| EP | 1036957 A1 | 9/2000 |
|---|---|---|
| JP | 2005226662 A | 8/2005 |

*Primary Examiner* — Joseph Brown
(74) *Attorney, Agent, or Firm* — Ditthavong & Steiner, P.C.

(57) ABSTRACT

A continuously variable transmission system for a hybrid vehicle is described. The system includes a belt-type continuously variable transmission that is adapted to receive torque from more than one power source. The belt-type continuously variable transmission includes a plurality of pulley sets, which are operatively connected by means of a belt extending over width-variable grooves defined between halves of the pulley sets. The belt is held in position by means of belt tightener. More than one pulley sets are adapted to act as drive pulleys for independently receiving torque from the power sources, whereas at least one pulley set is adapted to act as driven pulley for receiving the torque from the drive pulleys and transmitting the torque to a set of drive wheels for running the vehicle.

16 Claims, 6 Drawing Sheets

(51) Int. Cl.
*F16H 37/06* (2006.01)
*B60K 6/52* (2007.10)
*B60K 6/442* (2007.10)
*F16H 37/08* (2006.01)

(52) U.S. Cl.
CPC ....... *F16H 37/065* (2013.01); *F16H 37/0806* (2013.01); *B60Y 2200/92* (2013.01); *Y02T 10/62* (2013.01); *Y10S 903/918* (2013.01)

(58) Field of Classification Search
CPC .......... B60K 6/44; B60K 6/442; B60K 6/485; B60K 6/52; B60K 6/543; F16H 37/065; F16H 37/0806; F16H 9/04; F16H 9/12
USPC .......... 74/661; 180/65.21, 65.23, 65.26, 366; 180/368; 903/918; 474/87, 101
See application file for complete search history.

(56) References Cited

U.S. PATENT DOCUMENTS

| | | | | |
|---|---|---|---|---|
| 2,770,978 A * | 11/1956 | Troemel | ............ | F16H 9/16 474/35 |
| 2,831,358 A * | 4/1958 | Michie | ............ | F16H 9/16 474/35 |
| 2,927,470 A * | 3/1960 | Heyer | ............ | F16H 9/16 474/35 |
| 2,952,167 A * | 9/1960 | Nelson | ............ | F16H 37/0846 475/191 |
| 3,088,326 A * | 5/1963 | Woodward, Jr. | ............ | F16H 9/16 474/36 |
| 3,538,789 A | 11/1970 | Quick et al. | | |
| 3,641,843 A * | 2/1972 | Lemmens | ............ | F16H 37/0846 475/212 |
| 3,715,928 A * | 2/1973 | Case | ............ | F16H 3/00 474/1 |
| 4,056,987 A * | 11/1977 | Hoffmann | ............ | F16H 9/12 474/23 |
| 4,136,581 A * | 1/1979 | Winter | ............ | F16H 37/0846 474/32 |
| 4,196,641 A * | 4/1980 | Vogel | ............ | F16H 9/16 474/19 |
| 4,484,901 A * | 11/1984 | Toti | ............ | F16H 61/66263 474/28 |
| 4,588,040 A * | 5/1986 | Albright, Jr. | ............ | B60L 50/16 180/165 |
| 4,589,859 A | 5/1986 | Kanesaka | | |
| 4,875,893 A * | 10/1989 | Giacosa | ............ | F16H 9/12 474/28 |
| 4,884,653 A * | 12/1989 | Kouno | ............ | B60K 17/348 180/233 |
| 5,445,580 A * | 8/1995 | Parraga Garcia | ... | F16H 37/0846 477/211 |
| 5,755,303 A * | 5/1998 | Yamamoto | ............ | B60K 6/48 180/65.25 |
| 6,109,127 A * | 8/2000 | Liau | ............ | B60K 6/36 74/336 B |
| 6,155,954 A * | 12/2000 | Itoyama | ............ | B60K 6/543 477/5 |
| 6,414,453 B1 | 7/2002 | Tamagawa et al. | | |
| 6,926,632 B2 * | 8/2005 | Brown | ............ | F16H 9/16 474/35 |
| 7,217,205 B2 * | 5/2007 | Frank | ............ | F16H 9/18 474/28 |
| 7,654,930 B2 * | 2/2010 | Rohs | ............ | F16H 37/086 476/53 |
| 7,887,452 B2 * | 2/2011 | Kurihara | ............ | F16H 37/0846 475/211 |
| 8,961,351 B2 * | 2/2015 | Yamada | ............ | F16H 37/0846 475/211 |
| 9,738,312 B2 * | 8/2017 | Watling | ............ | B62D 11/105 |
| 2003/0092525 A1* | 5/2003 | Gu | ............ | B60K 6/543 475/5 |
| 2003/0092529 A1* | 5/2003 | Gu | ............ | B60K 6/543 477/44 |
| 2009/0000836 A1* | 1/2009 | Kydd | ............ | B60K 6/485 180/65.25 |
| 2016/0178035 A1* | 6/2016 | Tay | ............ | F16H 7/12 474/101 |
| 2017/0015187 A1* | 1/2017 | Manente | ............ | B60K 6/26 |
| 2018/0045606 A1* | 2/2018 | Mosier | ............ | F16H 7/16 |

\* cited by examiner

BELT DRIVEN CONTINUOUS VARIABLE TRANSMISSION SYSTEM FOR HYBRID VEHICLES

CROSS-REFERENCES TO RELATED APPLICATIONS

This application claims priority from a PCT Application Serial No. PCT/IB2015/059654, entitled "BELT DRIVEN CONTINUOUS VARIABLE TRANSMISSION SYSTEM FOR HYBRID VEHICLES," filed on Dec. 16, 2015, which claims priority from an Indian Patent Application Serial No. 1507/MUM/2015, entitled "BELT DRIVEN CONTINUOUS VARIABLE TRANSMISSION SYSTEM FOR HYBRID VEHICLES," filed on Apr. 10, 2015, the contents of which are hereby incorporated herein in their entirety by this reference.

FIELD OF THE INVENTION

The present invention relates to a continuously variable transmission system. More particularly, the present invention relates to a continuously variable transmission system of the belt-driven type of transmission for hybrid vehicles.

BACKGROUND

A transmission system is usually a gearbox for providing speed and torque conversions from a rotating power source to another device, and commonly includes clutch and drive shafts. The most typical use of the transmission system is in vehicles, where the transmission adapts the output of the internal combustion engine to drive the wheels. Other common uses of the transmission system are in machines for industrial, construction, agricultural, mining or other automotive applications. These transmission systems are designed with a set of fixed gear ratios; and the transmission shifts in step-wise manner between these finite gear ratios.

To overcome this drawback, continuously variable transmission systems have been developed, which can change seamlessly through an infinite number of effective gear ratios between a maximum gear ratio and a minimum gear ratio. These systems provide the benefit of changing the transmission ratio continuously, without jerking.

A typical belt-driven continuously variable transmission system includes two pulleys, each having two sheaves. A belt runs between the two pulleys, with the two sheaves of each of the pulleys sandwiching the belt there between. Frictional engagement between the sheaves of each pulley and the belt drives the belt along with the pulleys simultaneously. One of the pulleys may function as a drive or input pulley, and the other pulley (an output or driven pulley) can be driven by the drive pulley via the belt. The gear ratio is changed by moving the two sheaves of one pulley closer together and the two sheaves of the other pulley farther apart. When the sheaves of the pulleys are displaced, the V-shaped cross section reduces on one pulley and widens on another, causing the belt to ride higher on one pulley and lower on the other. This changes the effective driving diameters of the pulleys, which in turn changes the overall gear ratio.

Several efforts have been made in the field of continuously variable transmission systems. U.S. Pat. No. 6,174,260 teaches a continuously variable transmission in which the driven gear is positioned outside of the transmission chamber to make the transmission chamber small and to allow the transmission ratio of the drive force transmitted to the continuously variable transmission to be freely set by changing the external diameter of the driven gear.

Another U.S. Pat. No. 6,837,818 teaches a continuously variable transmission system without any hydraulic controls. The transmission system includes two pulley sets, each with two discs defining a V-shaped groove, a belt extending between the pulley sets, a forward-reverse control connected to the shaft of one of the pulley sets, and a clutch connected to the forward-reverse control, wherein the pulley sets, the forward-reverse control, and the clutch are each provided with a respective actuator of electro-mechanical type.

With the advent of hybrid vehicles, the traditional continuously variable transmission systems needed to be adapted to receive power from multiple sources. The application of the continuously variable transmission system in hybrid vehicles requires the output of both an electric motor and the internal combustion engine to be adapted to drive the wheels. The electric motor supplies a limited amount of power which can be used to drive the vehicle at lower speeds, whereas, at higher speeds power from the internal combustion engine is sourced. Additionally, usually a common shaft is provided which connects to the electric motor and the combustion engine. Thus, such transmission systems are designed such that the engine and the electric motor are both always driven at the same RPM. This fundamentally compromises the efficiency of the transmission system as both these power sources generate their maximum torques at different RPM's.

Hence, in the traditional designs only one of the power sources can be producing its maximum torque at any given point.

Also, the state of art technologies have a distinct transmission design for a fully hybrid vehicle which requires more than one electric motor and an auxiliary combustion engine. This is a complicated and costly design which is not compatible with the other mild hybrid vehicles.

US Patent Application No. 20150031501 teaches one such hybrid electric vehicle with a continuously variable transmission. The hybrid vehicle comprises a first set of drive wheels and a second set of drive wheels; a primary power source; a continuously variable transmission having a forward disconnect clutch configured to selectively couple and decouple the continuously variable transmission and the first set of drive wheels, the transmission configured to transmit torque from the power source to the first set of drive wheels; and an auxiliary power source operatively connected to the second set of drive wheels and configured to transmit torque thereto. This design is restricted to draw power from one or more power sources at the same RPM at any given point.

There is therefore felt a need to provide an improved continuously variable transmission system which will overcome at least partially the above-mentioned drawbacks in the prior art.

SUMMARY OF THE INVENTION

Accordingly, a primary object of the present invention is to provide a continuously variable transmission system which can simultaneously receive torque at different RPM from more than one power sources, viz., the internal combustion engine and the electric motor, thereby making the transmission system suitable for all kinds of hybrid vehicles, enabling different gear ratios simultaneously for the internal combustion engine and the electric motor, and giving improved performance and fuel efficiency.

Another object of the present invention is to provide a continuously variable transmission system which is adapted to give brake energy regeneration even while driving on the electric motor when the combustion engine is shut off, and continuously while braking.

Yet another object of the present invention is to provide a continuously variable transmission system which is suitable for industrial equipment wherein multiple inputs and multiple outputs are required to be driven at various speeds and various torques.

An additional object of the present invention is to provide a continuously variable transmission system which has a simple construction and is economical.

Other objects, aspects and advantages of the present invention will be more apparent from the following description.

Accordingly, the present invention discloses a continuously variable transmission system for a hybrid vehicle, comprising: a belt-type continuously variable transmission adapted to receive torque from more than one power sources, wherein said belt-type continuously variable transmission includes a plurality of pulley sets, said pulley sets operatively connected by means of a belt extending over width-variable grooves defined between halves of said pulley sets, said belt being held in position by means of belt tightener; and wherein, more than one pulley sets being adapted to act as drive pulleys for independently receiving torque from more than one power sources, and at least one pulley set being adapted to act as driven pulley for receiving the torque from said drive pulleys and transmitting said torque to set of drive wheels for running the vehicle, thereby said belt-type continuously variable transmission being adapted to be driven by means of torque received from one or more of said power sources, and said belt-type continuously variable transmission being adapted to provide power from at least one of said power sources across plurality of outputs.

The power sources are selected from internal combustion engine, electric motor, fuel cell, compressed air engine and high mass flywheel. Typically, said power sources include an internal combustion engine and at least one electric motor. The said electric motor is operatively connected to a battery.

Preferably, a first clutch unit can be provided between said internal combustion engine and said pulley set of said belt-type continuously variable transmission, said first clutch unit being adapted to selectively disengage said internal combustion engine and said pulley set. More preferably, a second clutch unit can be provided for selectively disengaging communication between said belt-type continuously variable transmission and said set of drive wheels. Furthermore, said electric motor is operatively connected to said pulley set of said belt-type continuously variable transmission. Alternatively, said electric motor can also be operatively connected to second set of drive wheels via a third clutch unit, said third clutch unit being adapted to selectively disengage said connection.

Additionally, said continuously variable transmission system may comprise an auxiliary power source for transmitting additional torque directly to said set of drive wheels.

Typically, a differential arrangement can be provided for transmitting said torque from said belt-type continuously variable transmission to said set of drive wheels.

Typically, said belt tightener can be adjusted to adapt with any change in the belt winding diameter. Preferably, said belt tightener comprises a plurality of rollers. Alternatively, said belt tightener may comprise an additional pulley for adapting with any change in the belt winding diameter. The transmission system may further comprise a fixed groove pulley in addition to the plurality of pulley sets.

Additionally, a planetary gear set can be provided in operative communication with said electric motor for adjusting the torque to said pulley set or said differential arrangement.

Preferably, said belt-type continuously variable transmission may comprise control means adapted to monitor winding diameter of said belt and thereby adjust said belt tightener. More preferably, said control means may be further adapted to perform at least one function selected from receiving vehicle operation data, receiving power source related data, receiving pulley set movement data, receiving transmission efficiency data and controlling operation of said belt-type continuously variable transmission.

The present invention discloses a continuously variable transmission system for a hybrid vehicle, comprising an auxiliary power source operatively connected to a set of drive wheels for transmitting torque thereof.

BRIEF DESCRIPTION OF THE DRAWINGS

The invention will now be described with the help of the following drawings, in which.

DETAILED DESCRIPTION OF THE INVENTION

Figure 1:
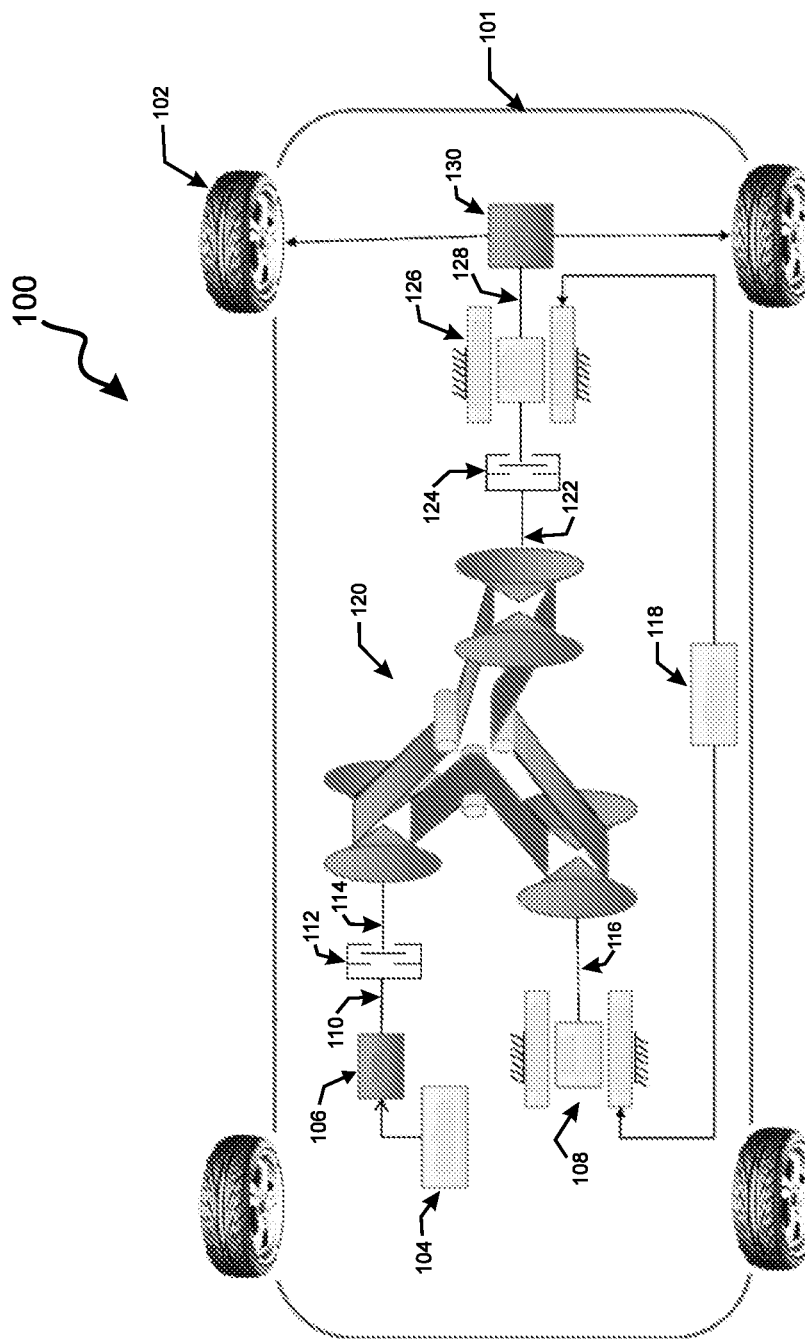
FIGS. 1 & 2 illustrate schematic of a preferred embodiment of the continuously variable transmission system of the present invention.

The embodiments herein and the various features and advantageous details thereof are explained with reference to the non-limiting examples in the following description. The examples used herein are intended merely to facilitate an understanding of the ways in which the embodiments herein may be practiced and to further enable those of skill in the art to practice the embodiments herein. Accordingly, the examples should not be construed as limiting the scope of the embodiments herein.

The description herein after, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The present invention envisages a novel continuously variable transmission system for a hybrid vehicle having more than one power sources. The continuously variable transmission system of the present invention is adapted to drive the vehicle as a parallel hybrid, series hybrid and series-parallel hybrid. The said transmission is designed to be connected to multiple power input sources through multiple rotating input shafts and distribute the power output to multiple rotating output shafts. The transmission is further adapted to give step less gear change between the input shafts and the output shafts. This enables the vehicle to move swiftly through the different modes of operation such as electric traction, engine traction and hybrid traction modes. The transmission is also designed to split the engine power in different ratios for different functions such as driving the vehicle and recharging batteries.

The continuously variable transmission system in accordance with the present invention comprises a belt-type continuously variable transmission adapted to receive torque from more than one power sources. The power sources may be selected from internal combustion engine, electric motor, fuel cell, compressed air engine and high mass flywheel. Typically, the power sources include an internal combustion engine and at least one electric motor. The belt-type continuously variable transmission comprises a plurality of pulley sets. Each pulley set comprises two pulley halves; both these halves are mounted about the same axis of rotation. The plurality of pulley sets are operatively connected by means of a single belt extending over width-variable grooves which are defined between the halves of the pulley sets. The groove width varies with displacement of the halves of the pulley sets, which changes the belt winding diameter and thereby alters the gear ratio. The transmission system may further comprise a fixed groove pulley or a simple roller together with more than one width-variable groove pulley sets. If the pulley with fixed (non-variable) groove is used then the winding diameter for that pulley remains constant and only the winding diameter of the remaining width-variable groove pulley sets varies while adjusting the gear ratios. The belt is held in position by means of belt tightener. The belt tightener may be adjusted to adapt with changes in the belt winding diameter. The belt tightener is preferably a plurality of spaced apart rollers over which the belt is wrapped. The plurality of rollers can freely rotate about their axis, and at least one of the rollers is adapted to move so as to maintain position of the belt and maintain the frictional engagement of the belt and the pulley sets with any change in the belt's winding diameter. Alternatively, the belt tightener may comprise an additional redundant pulley for holding the belt position with change in the winding diameter. This additional redundant pulley does not connect with any input or output but instead is simply adjusted to compensate for the changes in the overall winding diameter of the belt.

In accordance with the present invention, more than one pulley sets are adapted to act as drive pulleys for independently receiving torque from the power sources, and one or more of the pulley sets are adapted to act as driven pulley for receiving the torque from the drive pulleys and transmitting the torque to set of drive wheels for running the vehicle. Thus, a pulley set can also interchangeably act as a drive pulley or a driven pulley. The belt-type continuously variable transmission can therefore be driven by means of torque received from one or more power sources. Further, the power from the engine can be split in different variable ratios to drive the vehicle and charge the batteries. The belt-type continuously variable transmission is further adapted to split power from a single power source in multiple gear ratios simultaneously across plurality of outputs.

Additionally, the present invention provides an auxiliary power source, typically an electric motor, which directly provides its torque to the set of drive wheels, thereby adding to the torque from the belt-type continuously variable transmission.

Alternatively, the belt-type continuously variable transmission can be disengaged, and the vehicle can be driven by torque received only from the auxiliary power source.

Figure 2:
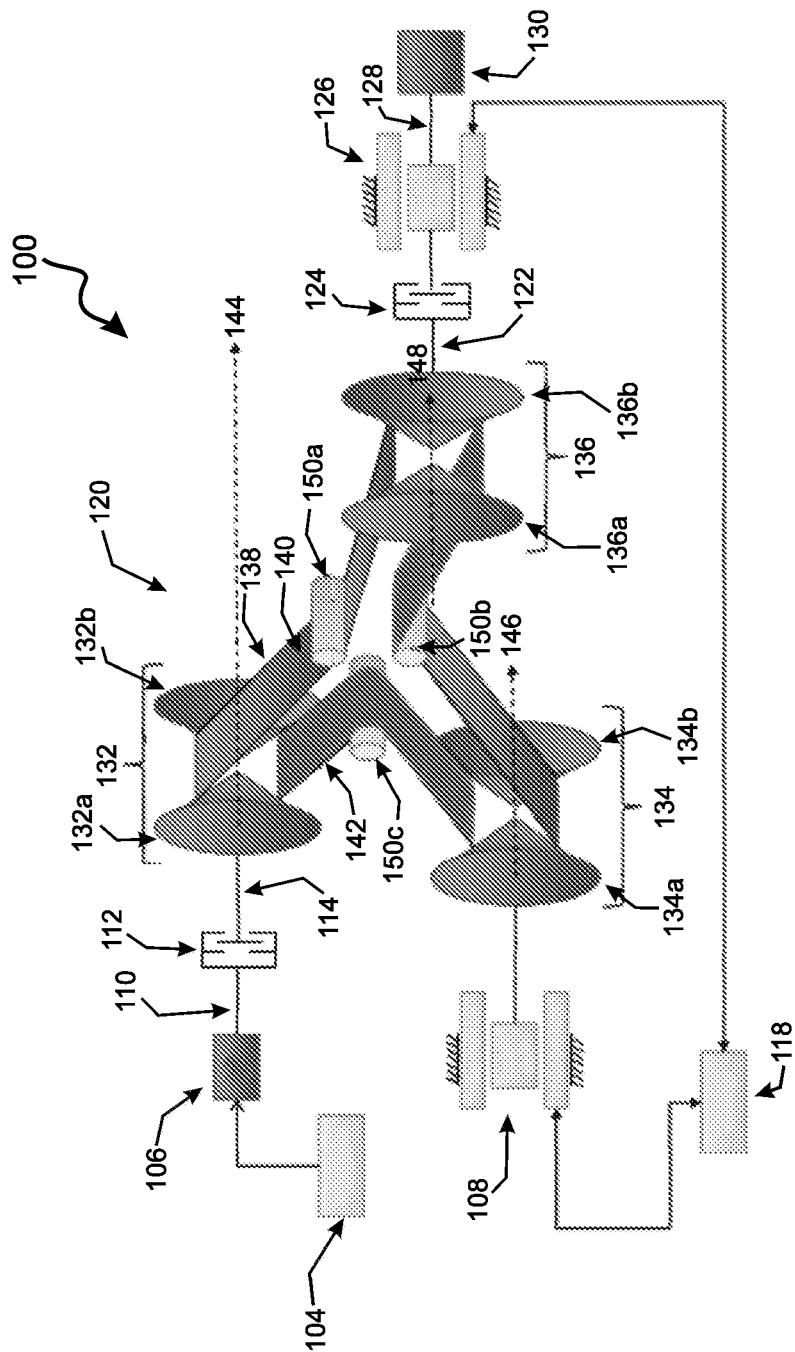

FIGS. 1 & 2 of the accompanying drawings illustrate a preferred embodiment of the present invention, the embodiment being generally referenced by numeral 100. The embodiment 100 shows a vehicle structure 101 and a set of front drive wheels 102. The torque is transmitted to the front wheels in the embodiment 100. The continuously variable transmission system is adapted to receive torque from two power sources, viz., an internal combustion engine 106 and a first electric motor 108. The internal combustion engine 106 is operatively connected to a fuel tank 104 for receiving the fuel and the first electric motor 108 is operatively connected to a battery 118 for receiving the electrical energy. The engine 106 burns the fuel to produce mechanical energy and the first electric motor 108 converts the electrical energy to mechanical energy, this mechanical energy is transmitted to a belt-type continuously variable transmission 120. The mechanical energy from the engine 106 is adapted to be transmitted from the engine 106 via a first engine input shaft 110. A first clutch unit 112 is provided between the engine 106 and the belt-type continuously variable transmission 120 for engaging and disengaging the engine 106 from the belt-type continuously variable transmission 120. When the engine 106 is engaged with the belt-type continuously variable transmission 120 the mechanical energy is transmitted via a second engine input shaft 114 to a first pulley set 132 of the belt-type continuously variable transmission 120. The first electric motor 108 is operatively connected to a second pulley set 134 by means of a motor input shaft 116.

The first electric motor 108 typically has a stationery stator and a rotor assembly which is driven by the electrical energy drawn from the battery 118. The rotor assembly is connected to the motor input shaft 116. The second engine input shaft 114 and the motor input shaft 116 are adapted to rotate at different speeds, and thus transmit different torques to the belt-type continuously variable transmission 120. The torque from the engine 106 is transmitted to the first pulley set 132 and the torque from the first electric motor 108 is transmitted to the second pullet set 134. The torque is coupled by the belt-type continuously variable transmission 120 and transmitted to a first output shaft 122 via a third pulley set 136. The input shafts and the output shaft are rotatable shafts or a flywheel. Thus, both the first pulley set 132 and the second pulley set 134 act as drive pulleys, and the third pulley set 136 acts as a driven pulley.

The first output shaft 122 connects the third pulley set 136 with a second clutch unit 124. A second output shaft 128 connects the clutch unit 124 and a differential 130. The clutch unit 124 selectively engages or disengages the transmission 120 from the differential arrangement 130 and the drive wheels 102. An auxiliary power source is provided by means of a second electric motor 126. The construction of the second electric motor 126 is similar to that of the first electric motor 108. The second electric motor 126 is operatively connected to the second output shaft 128. The rotor of the motor 126 is mounted on the second output shaft 128. The second clutch unit 124 allows the belt-type continuously variable transmission 120 to be engaged or disengaged from the set of drive wheels 102. When the second clutch unit 124 is engaged the torque from the belt-type continuously variable transmission 120, in addition to the torque from the second electric motor 126, is transmitted to the drive wheels 102 by means of a second output shaft 128 via a differential arrangement 130. This arrangement makes the vehicle a series-parallel or a parallel-hybrid. Alternatively, when the clutch unit 124 is disengaged then the belt-type continuously variable transmission 120 is disengaged from the second output shaft 128 in which case the vehicle is driven by the second electric motor 126 alone which is in operative communication with the second output shaft 128. In this arrangement the engine 106 and the first electric motor 108 can continue to operate independently, which makes the vehicle a series-hybrid.

The belt-type continuously variable transmission 120 is shown in detail in the FIG. 2. The transmission 120 comprises three pulley sets, viz., the first pulley set 132, the second pulley set 134, and the third pulley set 136. Each pulley set includes two halve pulleys (132a & 132b, 134a & 134b, and 136a & 136b), which are mounted about the same axis of rotation. The axis of rotation for the pulley sets 132, 134 & 136 is indicated by the numerals 144, 146 & 148, respectively. The three pulley sets are operatively connected by means of a single belt 138. The belt 138 is wrapped around the groves defined between the halves of the pulley sets. The width of the grooves varies with movement of the halves of the pulley sets. The belt has an outer surface 140 and an inner surface 142. In the preferred arrangement the belt is wrapped around the pulley sets in such a manner that the inner surface 142 contacts the pulley sets.

By using the three pulley sets the present invention discloses a unique design of the belt-type continuously variable transmission 120, which is in contrast to the two pulleys generally used in a conventional belt-type continuously variable transmission. However, to maintain the position of the belt 138, three rollers (150a, 150b & 150c) are used. The rollers (150a, 150b & 150c) are positioned proximal to a central axis in the said arrangement. In the preferred arrangement, the outer surface 140 of the belt is wrapped around the rollers (150a, 150b & 150c). At least one of the rollers (150a, 150b & 150c) is movable to adapt with any change in the belt winding diameter, thereby maintaining the belt position and its frictional engagement with the pulleys during operation.

The groove width can be altered by displacement of either or both of the halves. The belt 138 always contacts the pulley sets, hence the distance of the belt from the axis of rotation forms the effective winding radius. This distance is changed by movement of the pulley halves closer or farther. When the space between the halves is increased, the belt 138 comes closer to the axis of rotation, thereby reducing the effective winding radius. When the space between the halves is decreased, the belt 138 moves farther from the axis of rotation, thereby increasing the effective winding radius. The change in the winding radius will alter the gear ratio.

For a given linear movement of the belt 138, the speed of rotation of the pulley will increase with decrease in the winding radius, and vice versa. Hence, the ratio of the speed and consequently the gear ratio between the first pullet set 132 and the second pulley set 134 is proportional to the ratio of the winding radius of the first pullet set 132 and the second pulley set 134, respectively. The same will apply for the third pulley set 136.

Figure 3:
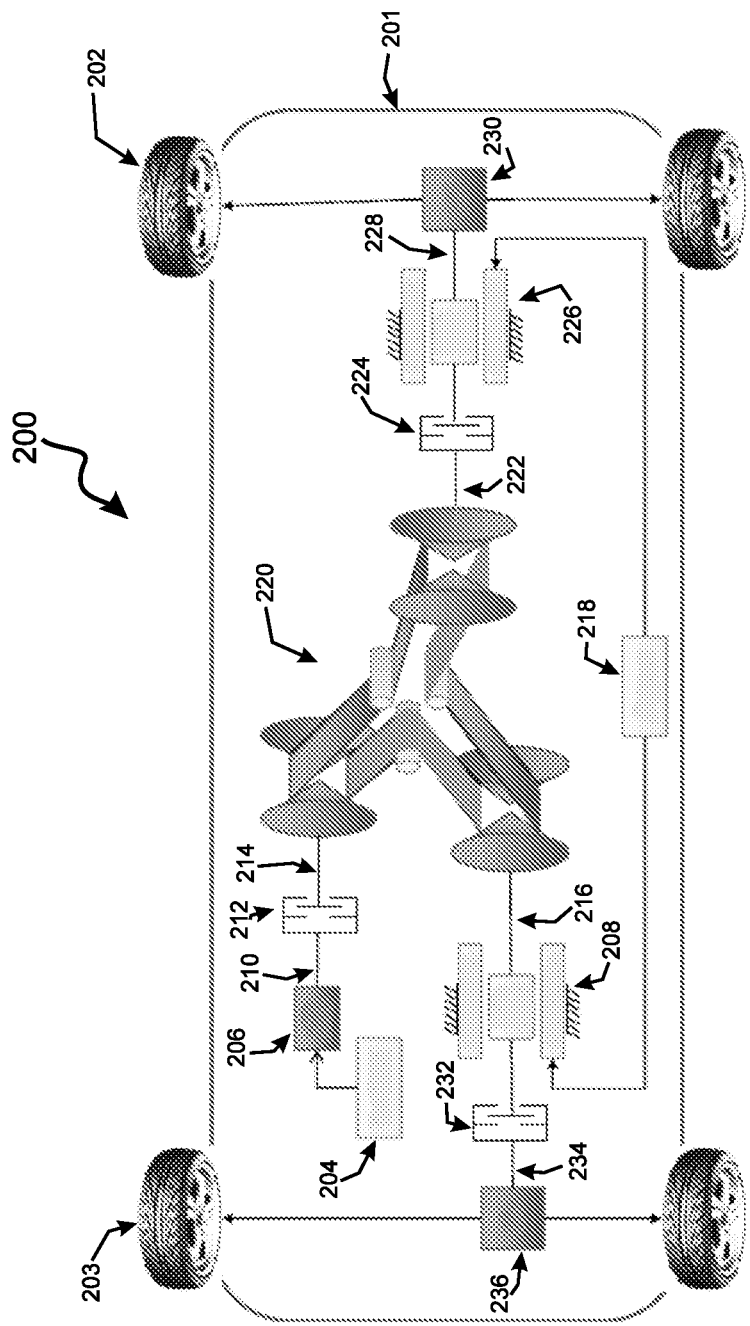
FIG. 3 illustrates schematic of another preferred embodiment of the continuously variable transmission system of the present invention.

Another preferred embodiment of the continuously variable transmission system of the present invention is illustrated in the FIG. 3 of the accompanying drawings, the embodiment being generally referenced by numeral 200. The embodiment 200 is an all wheel-drive operation. The embodiment 200 shows a vehicle structure 201, a set of front drive wheels 202 and a set of rear drive wheels 203. In the embodiment 200, both the front drive wheels 202 and the rear drive wheels 203 are adapted to receive torque from a belt-type continuously variable transmission 220. The construction of the belt-type continuously variable transmission 220 is similar to the transmission 120 described in embodiment 100.

The continuously variable transmission system 200 is adapted to receive torque from an internal combustion engine 206 and a first electric motor 208. The internal combustion engine 206 is operatively connected to a fuel tank 204 for receiving the fuel and the first electric motor 208 is operatively connected to a battery 218 for receiving the electrical energy. The engine 206 burns the fuel to produce mechanical energy and the first electric motor 208 converts the electrical energy to mechanical energy, this mechanical energy is transmitted to the belt-type continuously variable transmission 220. The mechanical energy from the engine 206 is adapted to be transmitted from the engine 206 via a first engine input shaft 210. A first clutch unit 212 is provided between the engine 206 and the belt-type continuously variable transmission 220 for engaging and disengaging the engine 206 from the belt-type continuously variable transmission 220. When the engine 206 is engaged with the belt-type continuously variable transmission 220 the mechanical energy is transmitted via a second engine input shaft 214 to a first pulley set of the belt-type continuously variable transmission 220. The first electric motor 208 is operatively connected to a second pulley set of the belt-type continuously variable transmission 220 by means of a motor input shaft 216.

The torque from the engine 206 is transmitted to the first pulley set and the torque from the first electric motor 208 is transmitted to the second pullet set. The torque is coupled by the belt-type continuously variable transmission 220 and transmitted to a first output shaft 222 via a third pulley set.

The first output shaft 222 connects the third pulley set with a second clutch unit 224. A second output shaft 228 connects the second clutch unit 224 and a differential arrangement 230. The second clutch unit 224 selectively engages or disengages the transmission 220 from the differential arrangement 230 and the drive wheels 202. An auxiliary power source 226 is operatively connected to the second output shaft 228. The auxiliary power source 226 is a second electric motor. The rotor of the electric motor 226 is mounted on the second output shaft 228. The second clutch unit 224 allows the belt-type continuously variable transmission 220 to be engaged or disengaged from the set of drive wheels 202 as well as the auxiliary power source 226. When the second clutch unit 224 is engaged the torque from the belt-type continuously variable transmission 220, in addition to the torque from the second electric motor 226, is transmitted to the drive wheels 202 by means of a second output shaft 228 via a first differential arrangement 230. Alternatively, when the clutch unit 224 is disengaged then the belt-type continuously variable transmission 220 is disengaged from the second output shaft 228 in which case the vehicle is driven by the second electric motor 226 alone which is in operative communication with the second output shaft 228. In this arrangement the engine 206 and the first electric motor 208 can continue to operate independent of the auxiliary power source 226 and the front drive wheels 202.

The first electric motor 208 is operatively connected to the set of rear drive wheels 203 by means of a third output shaft 234 via a second differential arrangement 236. A third clutch unit 232 is provided along the third output shaft 234. The third clutch unit 232 allows the first electric motor 208 to be disconnected from the set of rear drive wheels 203. When engaged the first electric motor 208 drives the vehicle by providing torque to the set of rear drive wheels 203. Additionally, the first electric motor 208 also provides torque to the belt-type continuously variable transmission 220.

Figure 4:
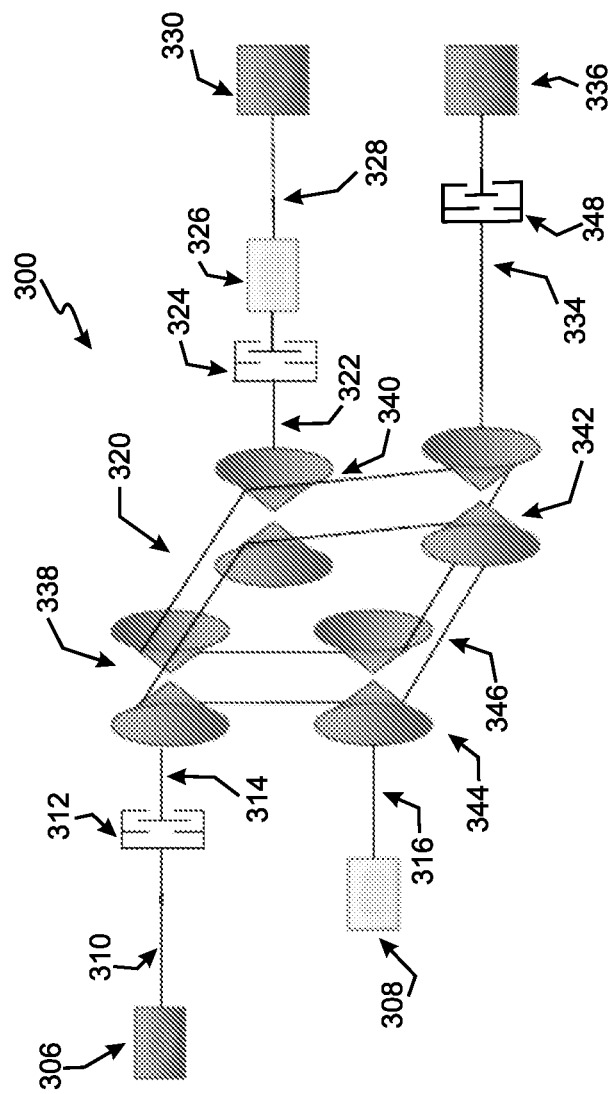
FIG. 4 illustrates schematic of yet another preferred embodiment of the continuously variable transmission system of the present invention.

FIG. 4 of the accompanying drawings illustrates yet another preferred embodiment of the continuously variable transmission system in accordance with the present invention, the embodiment being generally referenced by numeral 300. The embodiment 300 illustrates belt-type continuously variable transmission 320 having four pulley sets, viz., 338, 344, 340 & 342. An internal combustion engine 306 is operatively connected to the first pulley set 338. The torque from the internal combustion engine 306 is transmitted via a first engine input shaft 310. A first clutch unit 312 is provided along the first engine input shaft 310 between the engine 306 and the first pulley set 338 of the belt-type continuously variable transmission 320 for engaging and disengaging the engine 306 from the belt-type continuously variable transmission 320. When the engine 306 is engaged with the belt-type continuously variable transmission 320 the torque is transmitted via a second engine input shaft 314 to the first pulley set 338 of the belt-type continuously variable transmission 320.

A first electric motor 308 is operatively connected to a second pulley set 344 by means of a motor input shaft 316 to provide the torque thereof. In the embodiment 300, the first pulley set 338 and the second pulley set 344 act as drive pulleys. The torque from the engine 306 and the torque from the first electric motor 308 are coupled to drive the third pulley set 340 and the fourth pulley set 342. Thus, the third pulley set 340 and the fourth pulley set 342 act as driven pulleys in the embodiment 300. The pulley sets 338, 344, 340 & 342 are operatively connected by means of a single belt 346. The belt is positioned by means of belt tightener (not shown in FIG. 4).

The third pulley set 340 transmits torque by means of a first output shaft 322. The first output shaft 322 connects the third pulley set with a second clutch unit 324. A second output shaft 328 connects the second clutch unit 324 and a differential arrangement 330. The clutch unit 324 selectively engages or disengages the transmission 320 from the differential arrangement 330. A second electric motor 326 is operatively connected to the second output shaft 328. The second clutch unit 324 allows the belt-type continuously variable transmission 320 to be engaged or disengaged from a set of front drive wheels as well as the auxiliary power source, electric motor 326. When the second clutch unit 324 is engaged the torque from the belt-type continuously variable transmission 320, in addition to the torque from the second electric motor 326, is transmitted to the drive wheels by means of a second output shaft 328 via a first differential arrangement 330. The fourth pulley set 342 transmits torque to a set of rear drive wheels by means of a third output shaft 334 via a second differential arrangement 336, thereby giving an all wheel-drive operation. A third clutch unit 348 is provided along the third output shaft 334 for engaging and disengaging the connection of the fourth pulley set 342 with the second differential arrangement 336.

Figure 5:
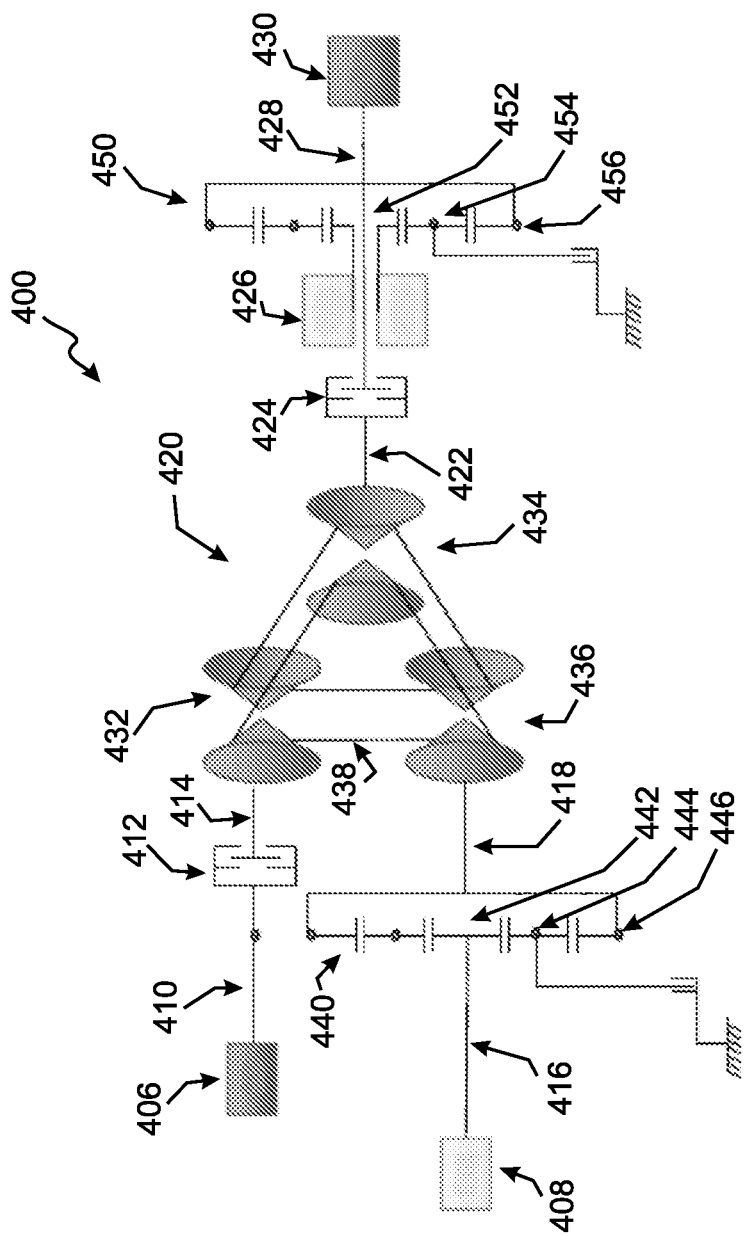
FIG. 5 illustrates schematic of an additional embodiment of the continuously variable transmission system of the present invention.

FIG. 5 of the accompanying drawings illustrates an additional preferred embodiment of the continuously variable transmission system in accordance with the present invention, the embodiment being generally referenced by numeral 400. The embodiment 400 is suitable with high speed electric motors. An internal combustion engine 406 is operatively connected to a first pulley set 432 of a belt-type continuously variable transmission 420. The torque from the internal combustion engine 406 is transmitted via a first engine input shaft 410. A first clutch unit 412 is provided along the first engine input shaft 410 between the engine 406 and the first pulley set 432 of the belt-type continuously variable transmission 420 for engaging and disengaging the engine 406 from the belt-type continuously variable transmission 420. When the engine 406 is engaged with the belt-type continuously variable transmission 420 the torque is transmitted via a second engine input shaft 414 to the first pulley set 432 of the belt-type continuously variable transmission 420.

A first electric motor 408 is operatively connected to a first motor input shaft 416. The first electric motor 408 is a high speed motor. A first planetary gear set 440 is provided along the motor input shaft 416. The rotor of the first electric motor 408 is operatively connected to a sun gear 442 of the first planetary gear set 440. The planet carrier 444 is held stationary. The ring gear 446 of the first planetary gear set 440 is operatively connected to a second motor input shaft 418. The second motor input shaft 418 operatively connects to a second pulley set 436 of the belt-type continuously variable transmission 420. The torque from the first electric motor 408 is transmitted to the second pulley set 436 via the first planetary gear set 440.

The torque from the first pulley set 432 and the second pulley set 436 is coupled to drive a third pulley set 434. The third pulley set 434 transmits torque by means of a first output shaft 422. The first output shaft 422 connects the third pulley set with a second clutch unit 424. A second output shaft 428 connects the second clutch unit 424 and a differential arrangement 430. The second clutch unit 424 selectively engages or disengages the transmission 420 from the differential arrangement 430. A second electric motor 426 is operatively connected to the second output shaft 428. The second electric motor 426 is also a high speed motor. The second clutch unit 424 allows the belt-type continuously variable transmission 420 to be engaged or disengaged from a set of front drive wheels as well as the second electric motor 426. When the second clutch unit 424 is engaged the torque from the belt-type continuously variable transmission 420, in addition to the torque from the second electric motor 426, is transmitted to the drive wheels by means of a second output shaft 428 via a first differential arrangement 430. A second planetary gear set 450 is provided in operative communication with the second electric motor 426 along the second output shaft 428. The rotor of the second electric motor 426 is operatively connected to a sun gear 452 of the second planetary gear set 450. The planet carrier 454 is held stationary. The ring gear 456 of the second planetary gear set 450 is operatively connected to the second output shaft 428.

Figure 6A:
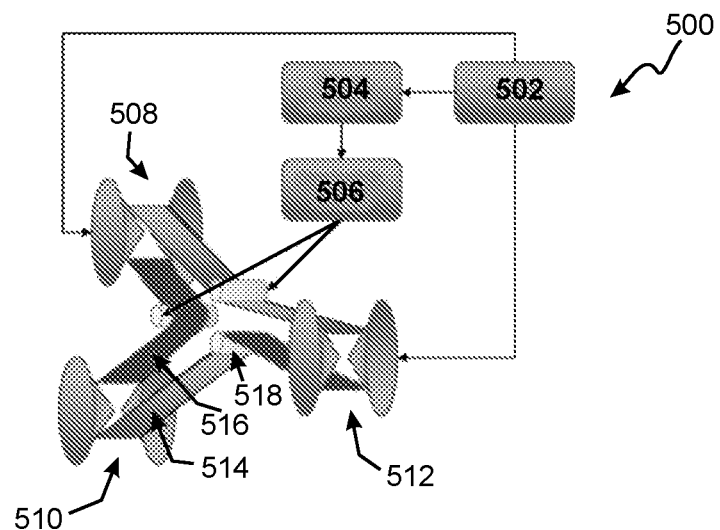
FIGS. 6A & 6B illustrate schematic of a preferred embodiment of the belt-type continuously variable transmission showing the pulley arrangement.
Figure 6B:
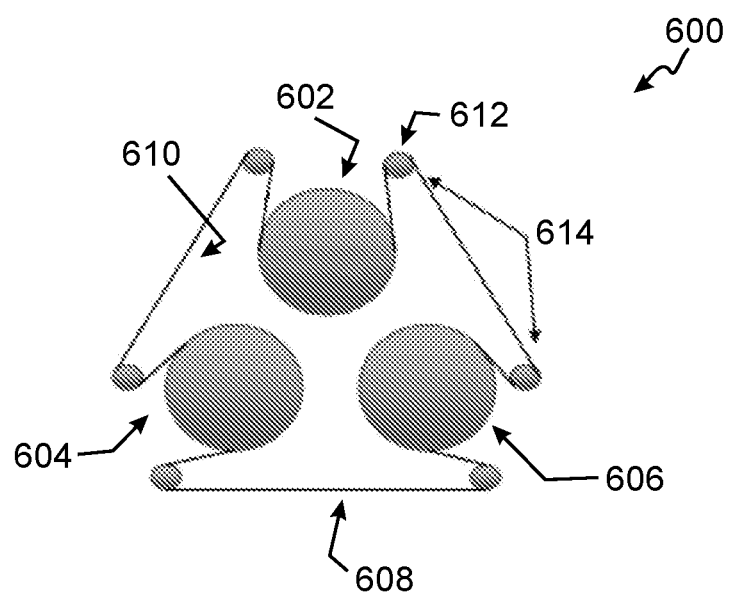

FIGS. 6A & 6B of the accompanying drawings illustrate the belt-type continuously variable transmission showing the pulley arrangement. In the preferred embodiment 500 illustrated in the FIG. 6A, an inner surface 516 of the belt is wrapped around the pulley sets 508, 510 & 512. The inner surface 516 of the belt remains in contact with the pulley sets 508, 510 & 512. Three rollers 518 are provided for maintaining the belt position. The rollers 518 are positioned proximal to a central axis along the outer surface 514 of the belt. The outer surface 514 of the belt is wrapped around the rollers 518. At least one of the rollers 518 is adjustable. The rollers 518 are rotatable about their axis. The belt-type continuously variable transmission 500 includes a control means having one or more sensors 502, a microcontroller 504 and a movement controller 506. The one or more sensors 502 are provided in operative communication with the pulley sets to monitor the displacement of the halves of the pulley sets. This data is conveyed to the microcontroller 504 in real-time which gives signals to the movement controller 506 for adjusting one or more of the rollers 518 to maintain the belt position. The control means may be further adapted to perform functions including receiving vehicle operation data, receiving power source related data, receiving pulley set movement data, receiving transmission efficiency data and further controlling operation of the belt-type continuously variable transmission.

Another preferred embodiment 600 of the belt-type continuously variable transmission is illustrated in the FIG. 6B. In the embodiment 600, six rollers 612 are provided. An outer surface 608 of the belt is wrapped around the pulley sets 602, 604 & 606, and an inner surface 610 of the belt is wrapped around the rollers 612 (as shown). A space 614 defined between consecutive rollers 612 is adjusted during the operation.

In yet another preferred embodiment of the present invention, the transmission system may further comprise a fixed groove pulley or a simple roller together with more than one width-variable groove pulley sets, where in operation the winding diameter of the fixed (non-variable) groove pulley remains constant and only the winding diameter of the width-variable groove pulley sets varies while adjusting the gear ratios.

The working of the present invention will now be explained with respect to the exemplary embodiment 100 which shall not be construed to limit the scope and ambit of the invention.

I) When the Vehicle is Driven by Engine 106:

In this mode of operation, the vehicle is driven by power from the engine 106 alone. The first electric motor 108 and the second electric motor 126 are not operated, hence the battery is not exhausted. The first clutch unit 112 is engaged. The engine 106 drives the belt-type continuously variable transmission 120 through the first pulley set 132, thereby driving the other pulley sets. The torque is then transmitted to the second pulley set 134 and the third pulley set 136 by means of the belt 138. The third pulley set 136 drives the first output shaft 122. The second clutch unit 124 is engaged so as to transmit the torque to the differential arrangement 130 via the second output shaft 128. The differential arrangement 130 thereby drives the set of front wheels 102. The gearing ratio is controlled by adjusting the first pulley set 132 and the third pulley set 136. The halves of the pulley sets are adjusted such that the relative winding radius of the belt with the first pulley set 132 and that of the third pulley set 136 forms the desired gearing ratio of the transmission. Since, first electric motor 108 is not used the settings of the second pulley set 134 are irrelevant.

II) When the Engine 106 Drives the Vehicle and Charges the Battery:

In this mode of operation, the engine 106 drives the vehicle and also charges the battery 118. The first electric motor 108 and/or the second electric motor 126 act as a generator for charging the battery 118. The first clutch unit 112 is engaged. The engine 106 drives the belt type continuously variable transmission 120 through the first pulley set 132, thereby driving the other pulley sets. The torque is then transmitted to the second pulley set 134 and the third pulley set 136 by means of the belt 138. The second pulley set 134 drives the first electric motor 108 via the motor input shaft 116. The second clutch unit 124 is engaged to transmit the torque to the drive wheels 102 via the differential arrangement 130. The torque from the engine 106 is therefore divided between the motor input shaft 116 and the first output shaft 122 through the second pulley set 134 and the third pulley set 136, respectively. The torque from the first output shaft 122 drives the second output shaft 128 via the clutch unit 124 which further drives the differential arrangement 130.

III) When the Engine 106 Only Charges the Battery:

In this mode of operation, the vehicle is stationary. The second clutch unit 124 is disengaged, thus the first output shaft 122 and the second output shaft 128 are disconnected. Hence, the first output shaft 122 can rotate independent of the vehicle speed. The first clutch unit 112 is engaged. The engine 106 drives the belt-type continuously variable transmission 120 through the first pulley set 132, thereby driving the other pulley sets. The first pulley set 132 drives the second pulley set 134 & the third pulley set 136. The second pulley set 134 drives the first electric motor 108 via the motor input shaft 116, where the first electric motor 108 acts as generator for converting the mechanical energy to electrical energy. The winding radius can be adjusted so that the engine 106 and the first electric motor 108 are driven at an optimum rpm.

IV) When the Vehicle is Driven by Electric Motor:

In this mode of operation, the vehicle can be driven by the first electric motor 108 and/or the second electric motor 126. When the second electric motor 126 is used to drive the vehicle the second clutch unit 124 is disengaged, so that the belt-type continuously variable transmission 120, the engine 106 and the first electric motor 108 are disconnected from the drive wheels 102. The second electric motor 126 uses the charge from the battery 118 to operate the second output shaft 128, and thereby the drive wheels 102 through the differential arrangement 130.

When both the first electric motor 108 and the second electric motor 126 are used the second clutch unit 124 is engaged. The first clutch unit 112 is disengaged, thus the engine 106 is not connected with the belt-type continuously variable transmission 120. Both the motors draw charge from the battery 118. The first electric motor 108 drives the second pulley set 134, which further drives the first pulley set 132 and the third pulley set 136. The first output shaft 122 is driven through the third pulley set 136. The torque of the first electric motor 108 is combined with the torque of the second electric motor 126 to drive the vehicle.

V) When the Vehicle Runs as a Parallel-Hybrid:

In this mode of operation, the vehicle is driven by a combined torque of all the three power sources, viz., the engine 106, the first electric motor 108 and the second electric motor 126. Both the first clutch unit 112 and the second clutch unit 124 are engaged. The engine 106 drives the first pulley set 132 and the first electric motor 108 drives the second pulley set 134. The combined torque drives the third pulley set 136, which in turn drives the first output shaft 122. The torque of the second electric motor 126 is added at the second output shaft 128. This combined torque drives the wheels 102.

VI) When the Vehicle Runs as a Series-Parallel Hybrid:

In this mode of operation, the engine 106 and one of the electric motors is operated to drive the vehicle, while the other electric motor acts as a generator to charge the battery 118. Assuming the first electric motor 108 acts as a generator and the second electric motor 126 drives the vehicle. The first clutch unit 112 is engaged. The engine 106 drives the belt-type continuously variable transmission 120 through the first pulley set 132, thereby driving the other pulley sets. The second pulley set 134 transfers torque to the first electric motor 108 which charges the battery 118. The second clutch unit 124 is also engaged. The third pulley set 136 drives the first output shaft 122. The torque of the second electric motor 126 is added at the second output shaft 128. Thus the combined torque from second electric motor 126 and the torque from ICE 106 drives the wheels 102.

VII) When the Vehicle Runs as a Series-Hybrid:

In this mode of operation, the second clutch unit 124 is disengaged, thus the engine 106, the first electric motor 108 and the belt-type continuously variable transmission 120 are isolated from the operation of the second electric motor 126. The first clutch unit 112 is engaged. The engine 106 drives the belt-type continuously variable transmission 120 through the first pulley set 132, thereby driving the other pulley sets. The second pulley set 134 transfers torque to the first electric motor 108 which charges the battery 118. The second electric motor 126 draws charge from the battery 118 to drive the vehicle through the second output shaft 128.

VIII) Regenerative Braking Mode:

Regenerative braking can be achieved by converting mechanical energy from the movement of the vehicle into electrical energy. The electric motors are used as generators in this mode. One or both of the motors can be used to convert the mechanical energy to electrical energy. If the second electric motor 126 alone is used as generator then the second clutch unit 124 is disengaged. This will disconnect the belt-type continuously variable transmission 120 from the first output shaft 122. Thus, the differential arrangement 130 drives only the second output shaft 128. The first electric motor 108 does not charge the battery 118.

When the second clutch unit 124 is engaged, the torque from the movement of the vehicle is transmitted via the second output shaft 128 to the first output shaft 122 and thereby to transmission 120. Hence the mechanical energy is transferred to all three pulleys of the transmission 120. The first clutch unit 112 remains disengaged. Hence, the engine 106 is shut off. The mechanical energy thus transferred to the second pulley set 134 is further transferred to the electric motor 108 through the shaft 116. This way the first electric motor 108 charges the battery 118. Hence the electric motors 126 as well as 108 can charge the battery 118.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

Embodiment of the present invention is applicable over a wide number of uses and other embodiments may be developed beyond the embodiment discussed heretofore. Only the most preferred embodiments and their uses have been described herein for purpose of example, illustrating the advantages over the prior art obtained through the present invention; the invention is not limited to these specific embodiments or their specified uses. Thus, the forms of the invention described herein are to be taken as illustrative only and other embodiments may be selected without departing from the scope of the present invention. It should also be understood that additional changes and modifications, within the scope of the invention, will be apparent to one skilled in the art and that various modifications to the composition described herein may fall within the scope of the invention.

The invention claimed is:

1. A continuously variable transmission system for a hybrid vehicle, comprising:
 a belt-type continuously variable transmission adapted to receive torque from more than one power source, wherein said belt-type continuously variable transmission includes a plurality of pulley sets, said pulley sets operatively connected by means of a belt extending over width-variable grooves defined between halves of said pulley sets, said belt being held in position by means of a belt tightener; and
 wherein, more than one pulley set, from the plurality of pulley sets, being adapted to act as drive pulleys for independently receiving the torque from the more than one power source, and at least one pulley set, from the plurality of pulley sets, being adapted to act as a driven pulley for receiving the torque from said drive pulleys and transmitting said torque to a set of drive wheels for running the vehicle, thereby said belt-type continuously variable transmission being adapted to be driven by means of the torque received from one or more of said power sources, and said belt-type continuously variable transmission being adapted to provide power from at least one of said power sources across a plurality of outputs.

2. The continuously variable transmission system as claimed in claim 1, wherein said power sources are selected from an internal combustion engine, an electric motor, a fuel cell, a compressed air engine, and a high mass flywheel.

3. The continuously variable transmission system as claimed in claim 2, wherein said power sources include the internal combustion engine and the electric motor, and wherein the more than one pulley set comprises a first pulley set and a second pulley set.

4. The continuously variable transmission system as claimed in claim 3, wherein a first clutch unit is provided between said internal combustion engine and said first pulley set of said belt-type continuously variable transmission, said first clutch unit being adapted to selectively disengage said internal combustion engine and said first pulley set.

5. The continuously variable transmission system as claimed in claim 3, wherein said electric motor is operatively connected to a battery.

6. The continuously variable transmission system as claimed in claim 3, wherein said electric motor is operatively connected to said second pulley set of said belt-type continuously variable transmission.

7. The continuously variable transmission system as claimed in claim 3, wherein said electric motor is operatively connected to said set of drive wheels via a third clutch unit, said third clutch unit being adapted to selectively disengage said connection.

8. The continuously variable transmission system as claimed in claim 1, wherein a second clutch unit is provided for selectively disengaging communication between said belt-type continuously variable transmission and said set of drive wheels.

9. The continuously variable transmission system as claimed in claim 1, wherein an auxiliary power source is provided for transmitting additional torque directly to said set of drive wheels.

10. The continuously variable transmission system as claimed in any of the preceding claims, wherein a differential arrangement is provided for transmitting said torque from said belt-type continuously variable transmission to said set of drive wheels.

11. The continuously variable transmission system as claimed in claim 10, wherein a planetary gear set is provided in operative communication with said electric motor for adjusting the torque to said pulley set or said differential arrangement.

12. The continuously variable transmission system as claimed in claim 1, wherein said belt tightener is adjustable to adapt with any change in a belt winding diameter.

13. The continuously variable transmission system as claimed in claim 12, wherein said belt tightener comprises a plurality of rollers.

14. The continuously variable transmission system as claimed in claim 1, wherein said belt-type continuously variable transmission comprises control means adapted to monitor a winding diameter of said belt and thereby adjust said belt tightener.

15. The continuously variable transmission system as claimed in claim 14, wherein said control means are further adapted to perform at least one function selected from receiving vehicle operation data, receiving power source related data, receiving pulley set movement data, receiving transmission efficiency data and controlling an operation of said belt-type continuously variable transmission.

16. A continuously variable transmission system as claimed in claim 1, wherein said power sources comprise an auxiliary power source operatively connected to a set of drive wheels for transmitting torque thereof.

* * * * *